United States Patent  (10) Patent No.: US 11,947,210 B1
Large et al.  (45) Date of Patent: Apr. 2, 2024

(54) IMPROVING VIEWER PRIVACY BY CONTROLLING OFF-AXIS CONTRAST WITH FACE RECOGNITION

(71) Applicant: Microsoft Technology Licensing, LLC, Redmond, WA (US)

(72) Inventors: Timothy A. Large, Southwater (GB); Neil Emerton, Redmond, WA (US); Sunando Sengupta, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/143,208

(22) Filed: May 4, 2023

(51) Int. Cl.
*G02F 1/1335* (2006.01)
*G02F 1/13* (2006.01)
*G06T 7/73* (2017.01)
*G06V 40/16* (2022.01)

(52) U.S. Cl.
CPC ...... *G02F 1/133514* (2013.01); *G02F 1/1323* (2013.01); *G06T 7/73* (2017.01); *G06V 40/172* (2022.01)

(58) Field of Classification Search
CPC ... G02F 1/133514; G02F 1/1323; G06T 7/73; G06V 40/172
See application file for complete search history.

(56) References Cited

U.S. PATENT DOCUMENTS

| 10,823,977 B2* | 11/2020 | Wang | H04N 13/366 |
| 2017/0116425 A1* | 4/2017 | Chang | G06V 40/172 |
| 2021/0195714 A1* | 6/2021 | Woodgate | G09G 3/20 |

* cited by examiner

*Primary Examiner* — Anne M Hines

(57) ABSTRACT

The present disclosure relates identifying an intended viewer and an unintended viewer of a liquid crystal display (LCD) using face recognition technology. Once identified the system may determine a face position for the unintended viewer. The system may modulate the voltage applied at a third electrode on the color filter layer of the LCD to achieve a certain off-axis contrast that may reduce the unintended viewer's visibility of the LCD without restricting the visibility of the intended viewer. Ultimately, the present disclosure provides enhanced privacy options for the intended viewer with a lightweight, inexpensive, and highly transportable system.

20 Claims, 11 Drawing Sheets

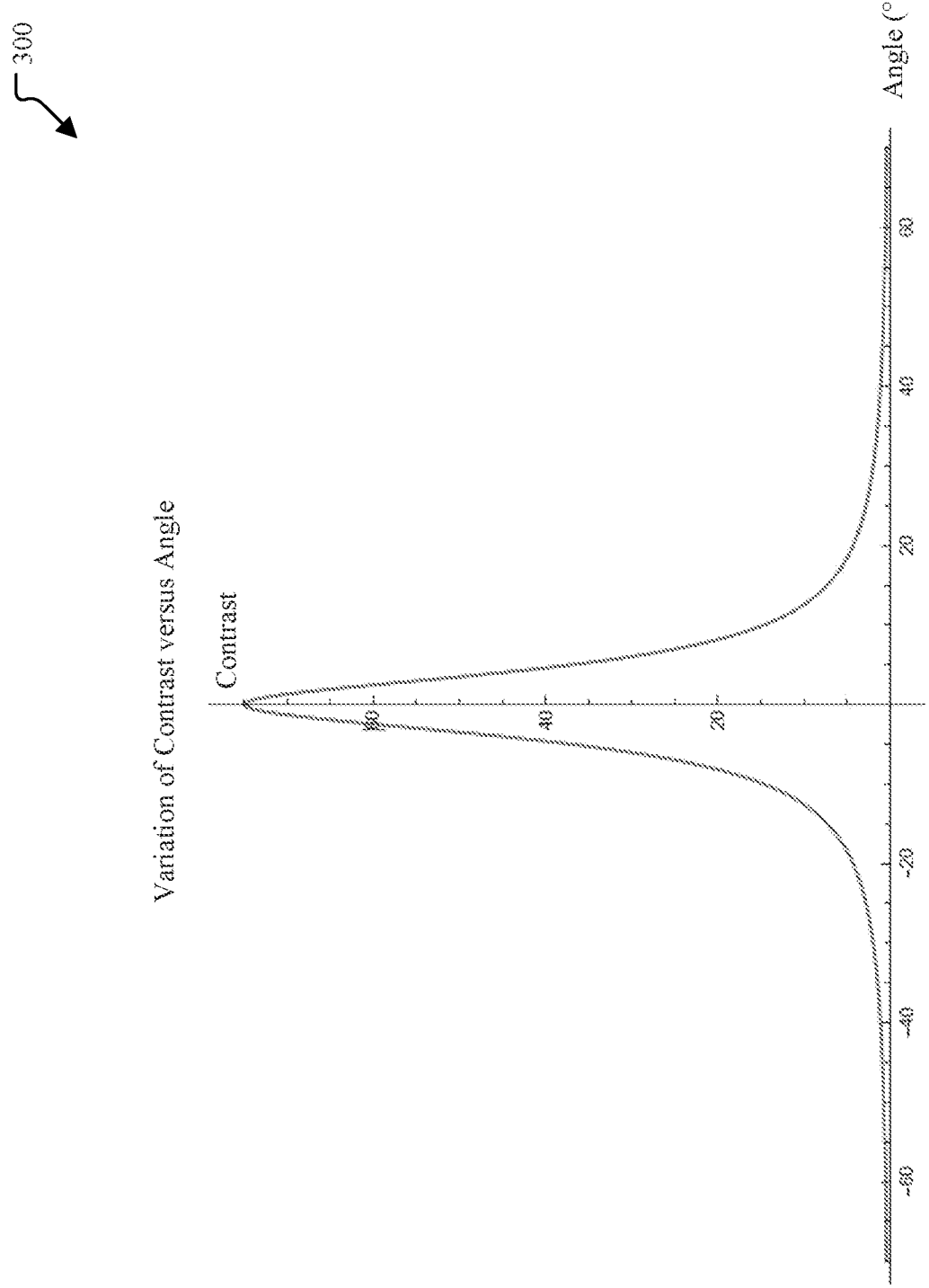

IMPROVING VIEWER PRIVACY BY CONTROLLING OFF-AXIS CONTRAST WITH FACE RECOGNITION

BACKGROUND

Remote and hybrid work options as well as travel requirements in the modern workplace often result in individuals working in public locations. Protecting the individual's privacy and the private data being viewed on their display is important while working in such public spaces. One option is to overlay a removable privacy screen over the display to restrict the visibility of the individual's computing device so that other people cannot see it. However, these overlay screens are often too complex, thick, heavy, and bulky to easily transport and utilize in a public space. Further, they are expensive to obtain and maintain relative to their usefulness in protecting privacy. Thus, many individuals working in a public space have limited options to protect their privacy and private data from unauthorized viewers.

It is with respect to these and other general considerations that examples have been described. Also, although relatively specific problems have been discussed, it should be understood that the examples should not be limited to solving the specific problems identified in the background.

SUMMARY

Aspects of the present disclosure relate to systems and methods for reducing the visibility of an in-plane switching liquid crystal display (LCD) to unintended viewers by decreasing the off-axis contrast of the LCD using both face recognition technology and modulation of the voltage to an additional "third" electrode of the LCD. That is, existing LCDs provide an image by rotating liquid crystal molecules in the plane of the LCD with a first electrode and a second electrode on a thin film transistor layer of the LCD to produce a high quality image with good contrast over a wide range of viewing angles. Embodiments described herein relate to modulating the voltage on an additional electrode, here referred to as the third electrode, on the color filter layer of the LCD to create a contrast region with reduced off-axis visibility without substantially restricting the on-axis visual experience.

In examples, an intended viewer of the LCD may be identified using face recognition. The system may then identify an unintended viewer of the LCD using face recognition and prompt the intended viewer to select a variable privacy mode for the LCD. If a privacy mode is selected the system may adjust the drive voltage for the third electrode of the LCD to pull the liquid crystal molecules out of plane. This decreases off-axis contrast and reduces the ability of the unintended viewer to perceive the LCD without substantially restricting the on-axis visual experience. Additionally, the off-axis contrast may be affected by the unintended viewer's off-axis angle from the LCD as determined with face recognition technology. System benefits include a lightweight design with minimal additional hardware adjustments to the existing LCD, eliminating the need for external privacy screens. Ultimately, the present disclosure provides enhanced privacy options for the intended viewer and protects a viewer's data with a lightweight, inexpensive, and highly transportable system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 3A is a graph displaying a variation of contrast versus viewing angle, according to aspects described herein.

DETAILED DESCRIPTION

Figure 1:
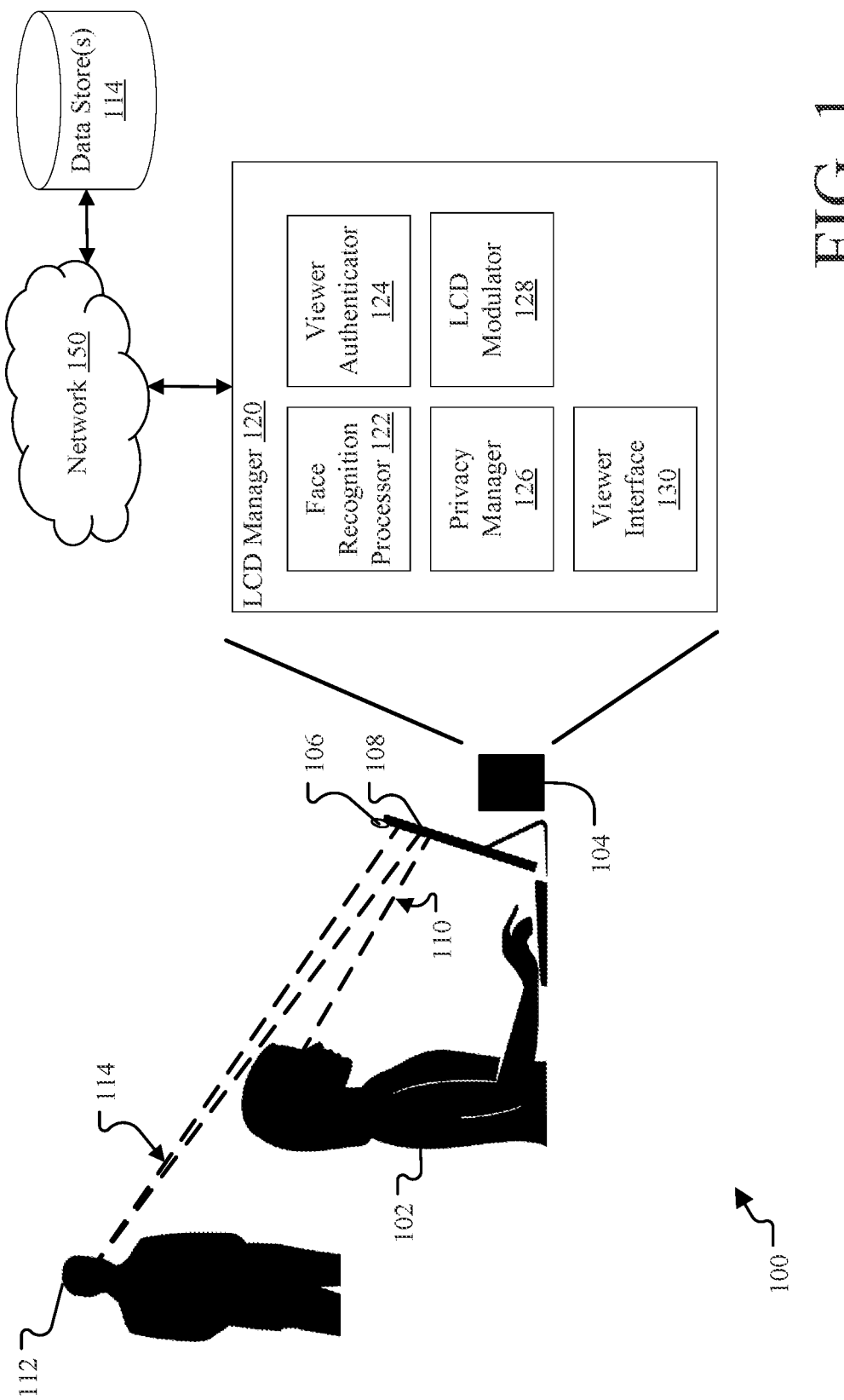
FIG. 1 is an environment illustrating a system for modulating the off-axis contrast of a LCD, according to aspects described herein.

In the following detailed description, references are made to the accompanying drawings that form a part hereof, and in which are shown by way of illustrations and specific examples. These aspects may be combined, other aspects may be utilized, and structural changes may be made without departing from the present disclosure. Examples may be practiced as methods, systems, or devices. Accordingly, examples may take the form of a hardware implementation or an implementation combining software and hardware aspects. The following detailed description is therefore not to be taken in a limiting sense, and the scope of the present disclosure is defined by the appended claims and their equivalents.

Screen privacy is a concern for individuals who utilize a computing device in public places such as a coffee shop, library, school, restaurant, and/or a means of public transport (e.g., airplane, bus, train, ride-share vehicle, etc.) among other examples. It is all too easy for an unsuspecting viewer of a computing device to not realize another viewer is looking at their display from some other position within the display's field of view. In such a case, important personal information and/or organization (e.g., business, club, non-profit, etc.) information may be viewed or compromised. Addressing this issue often involves expensive technology which may be unaffordable for many people. Less expensive options are external privacy filters that may be placed on top of the computing device. But the privacy filters are often bulky, difficult to keep in place easily, and restrict the viewer's field of view if their head position changes. Additionally, both the expensive technology and external filters add to the weight and size of what must be transported to the remote work location making them less than desirable for their intended application, mobile work environments. The result is that many individuals work in public spaces without adequate privacy protection for the "last foot" from the viewer to their display.

To address these issues, examples described herein introduce systems and methods to adjust the off-axis contrast of an LCD utilizing a combination of face recognition technology to direct the modulation of drive voltage applied to a third electrode on the color filter layer of the LCD. The third electrode pulls the liquid crystal molecules out of plane to decrease the off-axis contrast. As will be described in greater detail herein, the system identifies a face position of an unintended viewer at an off-axis position from the on-axis viewing angle of the LCD. Then based on the face position of the unintended viewer, the system modulates the drive voltage of a third electrode on the color filter layer of the LCD to set the contrast ratio (CR) equal to one at the face position of the unintended viewer. The system may then track and update the unintended viewer's face position to maintain the CR on the unintended viewer's face position.

The design has no external components and no additional LCD layer required create image contrast or image off-axis luminance reduction as in other solutions. This makes the system highly portable and an ideal solution for increasing privacy in public environments. Additionally, the system allows for varying privacy modes which can modulate contrast based on the viewer's preferences in a variety of lighting conditions. As the contrast is generated by modulating the drive voltage based on an unintended viewer's position the design functions well in multiple LCD orientations (e.g., portrait or landscape) meaning increased privacy can be afforded to mobile devices in addition to traditional desktop or laptop computers. Additionally, the solution is inexpensive relative to alternative solutions and therefore attainable for many viewers. In the final analysis, the system provides enhanced privacy options for viewers utilizing an LCD in a public space without increasing expense to the viewer and minimizing the amount of equipment that must be carried by the viewer to the public environment.

FIG. 1 is an environment illustrating a system for modulating the off-axis contrast of a LCD, according to aspects described herein. Environment 100 includes an intended viewer 102, a computing device 104 including an image capture device 106, LCD 108, and an LCD manager 120. The environment 100 further illustrates an unintended viewer 112 who, for the sake of this example is not authorized to view the LCD 108. The LCD manager 120 may include a face recognition processor 122, a viewer authenticator 124, a privacy manager 126, an LCD modulator 128, and a viewer interface 130. The computing device 104 and the LCD manager 120 may be connected via a network 150 to one or more data stores 114. The network 150 may comprise one or more networks such as local area networks (LANs), wide area networks (WANs), enterprise networks, the Internet, etc. and may include one or more of wired, wireless, and/or optical portions.

As will be explained in greater deal with respect to FIG. 4, the LCD 108 has a third electrode on the color filter layer in addition to first and second r electrode layers of an LCD 108. A fixed or variable voltage may be applied to the third electrode on the color filter layer to cause the contrast of the LCD 108 to decrease in a controlled manner. This creates a contrast region around the on-axis viewing angle, depicted by line 110 such that the off-axis viewers, such as unintended viewer 112 have reduced visibility of LCD 108 without substantially restricting the on-axis visual experience of the intended viewer 102, who is on-axis. The on-axis viewing angle 110 of the LCD 108 is a viewing angle that is roughly perpendicular to the LCD 108 coming out towards the intended viewer 102. The on-axis viewing angle 110 may be the zero degrees position with the field of view for face recognition is based on the field of view associated with the lens of the image capture device from the on-axis viewing angle 110.

As the viewing angle for the unintended viewer 112 increases, the system functions so that for the intended viewer 102 the on-axis viewing angle 110 remains visible while the off-axis viewing angle 114 for the unintended viewer 112 has decreased contrast and poor visibility. As will be described in greater detail below, the off-axis contrast and associated visibility of the display 108 from the unintended viewer's 112 position may be adjusted by applying voltage to a third electrode on the color filter layer, increasing the off-axis viewing angle of the unintended viewer 112, and/or by a combination of the two.

In examples, an intended viewer 102 may be using a computing device 104 with an LCD 108 in a public place. The intended viewer 102 may access the computing device 102 and the image capture device 106 may capture one or more images of the face of the intended viewer 102 which may then be authenticated using the face recognition processor 122. As shown, the gaze of the intended viewer 102 is substantially similar to the on-axis viewing angle 110 of the LCD 108, which is also shown in FIG. 2 discussed below.

The intended viewer 102 may be using the computing device 104 to perform some task such as viewing a word document, editing a spreadsheet, or viewing other content via the network 150. Some aspects of the task being performed may include personal and/or private information relative to the intended viewer 102 and/or a separate organization (e.g., a business, employer, non-profit, etc.). While the intended viewer 102 is using the computing device 104, the face recognition processor 122 may identify a second, unauthorized viewer 112 as within the field of view of the LCD 108 based on an image captured by the image capture device 106. To identify the unintended viewer 112, the face recognition processor 122 may analyze images captured by the image capture device 106 for additional viewers to the intended viewer 102. The face recognition processor 122 may use a variety of face recognition techniques utilizing two-dimensional and/or three-dimensional images as well as a more and/or less complex face feature analysis including one or more machine learning and or deep neural network algorithms to identify a viewers face. In examples, the face recognition techniques may involve one or more of an Eigenfaces analysis, linear discriminant analysis, independent component analysis, feature based analysis, two-dimensional and/or three-dimensional model based analysis, and/or a combination of these and other methods. One having skill in the art will understand how to apply such techniques.

In examples, the system may be able to determine an estimation of the pointing direction of an unintended viewers 112 face in addition to the face position. The pointing direction of the face may be determined by measuring the displacement between the centroid provided by the face recognition algorithms in identifying the face features (eyes, nose, mouth, chin-line, etc.) of the unintended viewer relative to the LCD 108. Once these face features are identified the face recognition algorithm may be able to determine the pointing direction of the face. By identifying pointing direction, the system can determine to a greater degree of accuracy if the unintended viewer 112 has a face positioned towards the LCD 108. In instances where the unintended viewers 112 face is not positioned towards the LCD 108, the system may automatically determine that there is low privacy risk and maintain a normal operating mode. This operating method may be desirable to minimize nuisance privacy mode employments.

In additional examples, a deep neural network (DNN) may be utilized to determine the gaze direction of the unintended viewer 112, independent of the unintended viewers 112 face position. The DNN may analyze the face features of an unintended viewer 112, specifically focusing on face features relating to the unintended viewers 112 eyes, eye position, brow, etc. to determine the gaze location. Using a DNN, the system can determine to a greater degree of accuracy, if the unintended viewer 112 is gazing at the LCD 108 or at a different position. In instances, where the system determines the unintended viewer 112 is not gazing at the LCD 108 it may automatically determine that there is low privacy risk and maintain a normal operating mode, to minimize nuisance privacy mode employments.

Additionally, to track an unintended viewer 112 the face recognition processor 122 may identify one or more face position indicators relating to various face features of the unintended viewer's 112 face (e.g., eye position, nose, cheek structure, mouth, forehead, eyebrows, chin, etc.). The intended viewer 102 may or may not be aware of the presence of the unintended viewer 112.

Once the unintended viewer 112 is identified the privacy manager 126 determines if the intended viewer 102 has selected a privacy mode and/or the LCD manager 120 has a privacy mode set automatically as may be the case for a public computer with multiple different viewers (e.g., a library or school computer). If no privacy mode has been set, the privacy manager 126 may prompt the intended viewer 102 via the viewer interface 130, to select a privacy mode for LCD 108. One having skill in the art will understand that the prompt may take a plurality of forms on the screen including but not limited to a pop-up window, task bar notification, menu option and/or some other icon on the LCD 108. The intended viewer 102 may choose to select a privacy mode or not by selecting a selectable option (e.g., button, tab, link, field, etc.) of the prompt. If no privacy mode is selected or pre-set for the computing device 104, there is no change to the LCD 108. Once a privacy mode is selected and applied to the system, any subsequent viewer who enters the field of view of the LCD 108 will see an off-axis contrast reduction and corresponding reduced visibility. In this way, the intended viewer's 102 privacy may be protected even in a situation where multiple unintended viewers are within the field of view of LCD 108.

In examples where multiple unintended viewers are within the field of view of LCD 108, the system may be configured to decrease contrast for the closest unintended viewer 112 of the multiple unintended viewers. Determining the closest unintended viewer 112 may involve using face recognition technology to measure unintended viewer 112 proximity using one or more face position indicators and the face position of each of the unintended viewers. Additionally, as discussed above, the system may be configured to determine, using the one or more face position indicators, the face position, face pointing direction, and/or gaze direction of the multiple unintended viewers. Based on the face position, face pointing direction, and/or gaze direction of the unintended viewers the system can determine which unintended viewers are looking towards the LCD and which are looking somewhere else. The system may disregard unintended viewers who are gazing in a direction away from the LCD 108. Thus, if an unintended viewer 112 has the closest proximity to the LCD 108 but is gazing in a different direction, the system may identify the unintended viewer 112 which the second closest proximity to the LCD 108 and decrease contrast based on that unintended viewer.

In embodiments, the privacy manager 126 may have one or more types of privacy modes in addition to a public mode to the intended viewer 102. The public mode, as used herein is the LCD that a viewer sees when there is high visibility regardless of viewing angle and no drive voltage applied to the third electrode on the color filter layer of the LCD 108. There are two other types of privacy modes, fixed voltage privacy modes and variable voltage privacy modes. Voltages may modulate the third electrode on the color filter layer in either a fixed or variable method to generate or reduce contrast. As such, the general characteristics of the mode types will be discussed without specifying exact voltage values which may vary based on LCD 108 capabilities.

The one or more fixed voltage privacy modes have a fixed voltage to modulate the third electrode on the color filter layer regardless of the position of the unintended viewer 112. If selected and/or preset, the fixed voltage privacy mode may reduce contrast off-axis without substantially restricting the on-axis visual experience. However, the fixed voltage privacy mode has significant contrast reduction as the off-axis viewing angle 114 of the unintended viewer 112 increases in either direction until an off-axis point where contrast inversion occurs. At contrast inversion the LCD 108 is visible to the unintended viewer 112 with the contrast colors inverted on the LCD 108. In this case, the off-axis contrast is consistently applied across the field of view of the LCD 108 with variations in contrast resulting from a changing off-axis viewing angle 114 of the unintended viewer 112. The face recognition processor 122 tracks and updates the face position of the unintended viewer 112 even though the voltage is fixed, so that the system may alert the intended viewer 102 when the unintended viewer 112 has exited the field of view.

The one or more variable voltage privacy modes may have a variable voltage (e.g., low, medium, high, etc.) to modulate the third electrode on the color filter layer based on the position of the unintended viewer 112. At higher voltages, the contrast is greater across the LCD 108 which may equate to greater privacy within the environment 100. However, as will be explained in greater detail with respect to FIGS. 3A-3B, at higher voltages the contrast region is narrower meaning the on-axis visibility region for the intended viewer 102 is smaller, without being substantially restricted. If a variable voltage privacy mode is selected and/or pre-set the LCD modulator 128 may receive a face position for the unintended viewer 112, determine an off-axis viewing angle 114 for the unintended viewer 112, and modulate the drive voltage of the third electrode on the color filter layer to create zero-visibility at the off-axis viewing angle 114 of the unintended viewer 112. The CR equals one position is the point of zero visibility for an off-axis viewer. The unintended viewer 112, if they look at the LCD 108 from the viewing angle 114 may then see a low contrast LCD 108 which obscures their ability to view the information on the LCD 108. The face recognition processor 122 may then continuously track and update the face position of the unintended viewer 112 and pass the updated face position for the unintended viewer 112 to the LCD modulator 128. If necessary, the LCD modulator 128 may update the voltage applied to the third electrode on the color filter layer to maintain low visibility for the unintended viewer 112 across the field of view of the LCD 108. The applied voltage and resulting low visibility for the unintended viewer 112 may be maintained until the unintended viewer 112 is outside the field of view of the LCD 108. This may mean modulating the applied voltage based on the off axis viewing angle 114 of the unintended viewer 112 and/or the face position relative to the LCD 108. The intended viewer may see some contrast change on-axis 110 based on the unintended viewer's 112 position. This changing contrast can be mitigated by digitally modulating, by the LCD modulator 128, the displayed image so that the on-axis visual experience is not substantially restricted. In some embodiment, the LCD modulator 128 may utilize one or more aspects of machine learning (ML) to modulate the voltage applied to the third electrode on the color filter layer, as will be understood by one having skill in the art.

In both the fixed voltage privacy modes and variable voltage privacy modes when the face recognition processor 122 determines that the unintended viewer 112 is no longer in the field of view of the LCD 108 the viewer interface 130 may display a prompt to the intended viewer 102 to select an updated privacy mode and/or turn the privacy mode to a public operation.

In some examples, the application of a privacy mode may cause limited degradation of the on-axis contrast for the intended viewer 102 without substantially restricting the one-axis visual experience. In examples, the application of a contrast region may result in a screen that is still substantially visible on-axis but somewhat obscured because the contrast region may generate a narrow on-axis 110 field of view. The visibility may be worsened if the intended viewer 102 changes face position relative to the on-axis angle 110. Additionally, in other examples, the intended viewer 102 may reposition their face relative to the on-axis angle of the LCD 108 which may reduce the user's visual experience of the LCD 108 at certain off-axis viewing angles. To address these situations in some examples, the computing device 104 may utilize the image capture device 106 to monitor and track the intended viewer's 102 face position relative to the on-axis viewing angle 110 of the LCD 108. The face recognition processor 122 may periodically and/or continuously utilize the captured images of the intended viewer 102 including one or more face position indicators relating to various face features of the intended viewer's 102 face. The face recognition processor 122 may determine a first face position of the intended viewer's 102 face relative to the on-axis viewing angle 110 based on the face position indicators. In some embodiments, the face recognition processor 122 may use aspects of ML to monitor, track and/or determine face position information. The LCD modulator 128 may receive the first face position of the intended viewer 102 and modulate the drive voltage based on the first face position to improve and/or retain the intended viewer's 102 experience of LCD 108 with limited contrast. The face recognition processor 122 may then continuously track and update the face position of the intended viewer 102 and pass the updated face position for the intended viewer 102 to the LCD modulator 128. If necessary, the LCD modulator 128 may update the voltage modulation applied to the third electrode on the color filter layer to improve and/or retain the intended viewer's 102 experience of LCD 108.

The viewer authenticator 124 authenticates a viewer for granting access to the computing device 104 and/or determining if an intended viewer 102 should apply a privacy mode among a plurality of other reasons. To authenticate a viewer the image capture device 106 may capture one or more images with one or more face position indicators included in the images. The captured images may be compared to stored images with stored face position indicators for one or more previously authenticated viewers by the viewer authenticator 124. Matching may involve exceeding a threshold of matched face position indicators between the captured image and stored image. If the viewer authenticator 124 can match the captured image with a stored image the viewer may be authenticated. Conversely, if the captured image and stored image cannot be matched then the viewer may not be authenticated. In some embodiments, the viewer authenticator 124 may use aspects of ML to authenticate a viewer and grant them access to the computing device 104, and/or determining if an intended viewer 102 should apply a privacy mode. Authentication can serve several purposes. For example, if the intended viewer 102 is authenticated at initial login they may be prompted via the viewer interface 130 to select a privacy mode at initial login. In another example, the system may be designed such that only authenticated viewers may make privacy mode selections. In a further example, the LCD manager 120 may be designed such that authenticated unintended viewers may not require a privacy mode to be applied such that an authenticated unintended viewer 112 may enter the field of view of the LCD 108 and a privacy mode may not be applied.

In examples, the computing device 104 may be any of a variety of computing devices, including, but not limited to, a mobile computing device, a laptop computing device, a tablet computing device, a desktop computing device, a video game computing device, vehicle computer, and/or any device which may be used in combination with an LCD 108. Computing device 104 may be configured to execute one or more applications (not pictured) and/or services and/or manage hardware resources (e.g., processors, memory, etc.), which may be utilized by viewers of the computing device 104. The computing device 104 can send and receive content data as input or output which may be, for example from a microphone, an image capture device (e.g., a camera), a global positioning system (GPS), etc., that transmits content data, a computer-executed program that generates content data, and/or memory with data stored therein corresponding to content data. The content data may include visual content data, audio content data (e.g., speech or ambient noise), a viewer-input, such as a voice query, text query, etc., an image, an action performed by a viewer and/or a device, a computer command, a programmatic evaluation gaze content data, calendar entries, emails, document data (e.g., a virtual document), weather data, news data, blog data, encyclopedia data and/or other types of private and/or public data that may be recognized by those of ordinary skill in the art. In some examples, the content data may include text, source code, commands, skills, or programmatic evaluations.

Computing device 104 may each include at least one processor, such as face recognition processor 122, that executes software and/or firmware stored in memory. The software/firmware code contains instructions that, when executed by the processor causes control logic to perform the functions described herein. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the examples, various logic may be implemented in any appropriate fashion and would remain in accordance with the examples herein disclosed In accordance with some aspects, the computing device 104 may have access to data contained in a data store 112, as well as the ability to store data in data store 114. The data store 114 may contain a plurality of content related to face recognition and contrast modulation. Data store 114 may be a network server, cloud server, network attached storage ("NAS") device, or another suitable computing device. Data store 114 may include one or more of any types of storage mechanism or memory, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. In some instances, the data store 114 may be configured as an embedding object memory. Although only one instance of the data store 114 is shown in FIG. 1, the environment 100 may include two, three, or more similar instances of the data store 114. Moreover, the network 150 may provide access to other data stores similar to data store 114 that are located outside of the environment 100, in some examples.

In some examples, the network 150 can be any suitable communication network or combination of communication networks. For example, network 150 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, network 150 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

As will be appreciated, the various methods, devices, apps, nodes, features, etc., described with respect to FIG. 1 or any of the figures described herein, are not intended to limit the system to being performed by the particular applications and features described. Accordingly, additional configurations may be used to practice the methods and systems herein and/or features and apps described may be excluded without departing from the methods and systems disclosed herein.

Figure 2A:
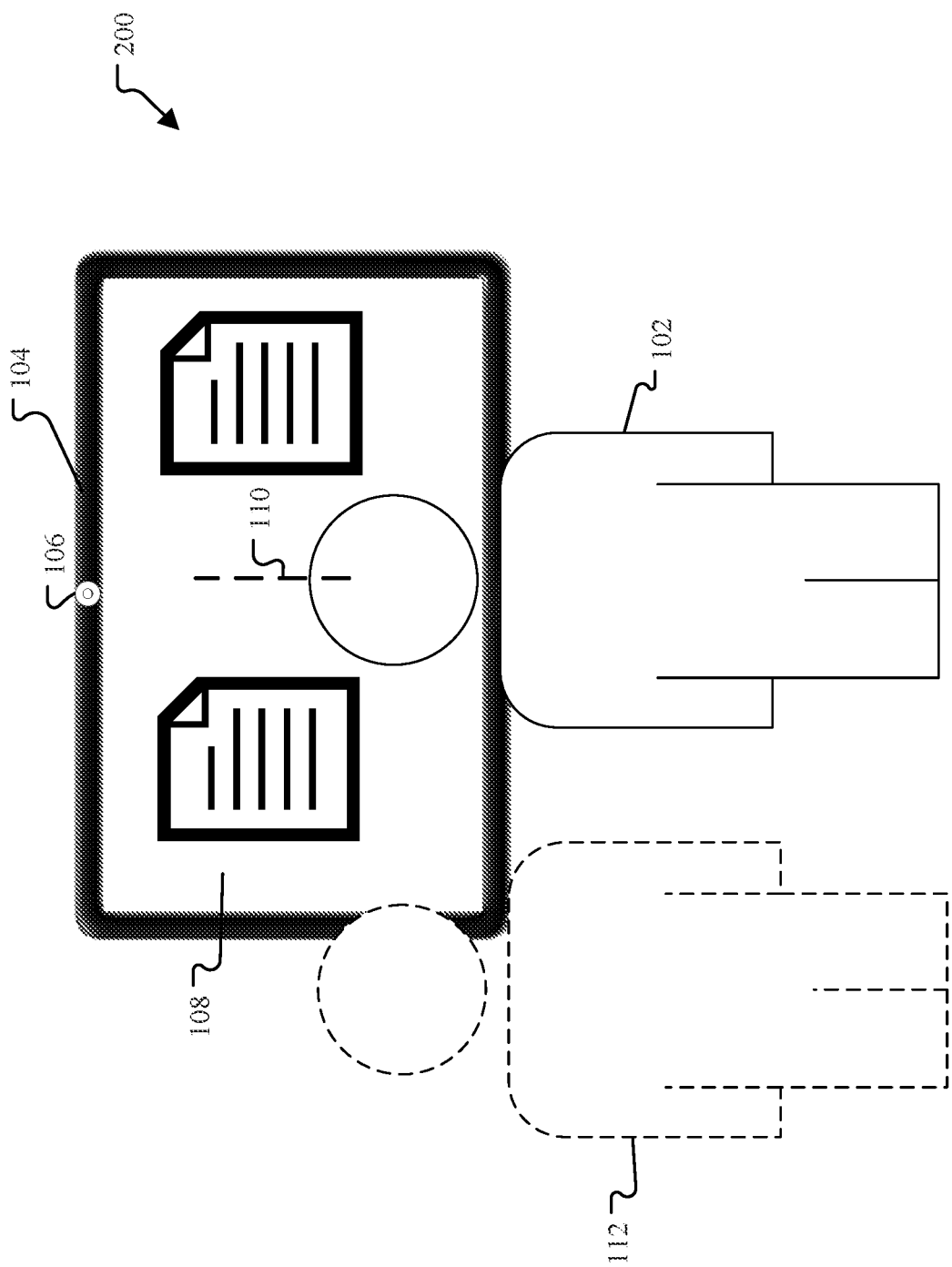
FIG. 2A illustrates an exemplary LCD from the on-axis perspective of an intended viewer when a privacy mode is utilized, according to aspects described herein.

FIG. 2A illustrates an exemplary LCD from the on-axis perspective of an intended viewer when a privacy mode is utilized, according to aspects described herein. The on-axis viewing angle 110 of the intended viewer 102 is shown as aligned with the zero-degree angle from the LCD 108. With a privacy mode applied the intended viewer sees minimal reduction in visibility and resolution from the voltage applied to the third electrode on the color filter layer. The image capture device 106 may track and update the face position of the intended viewer 102 so that while the intended viewer remains within the contrast region the visibility of the LCD 108 remains constant.

Figure 2B:
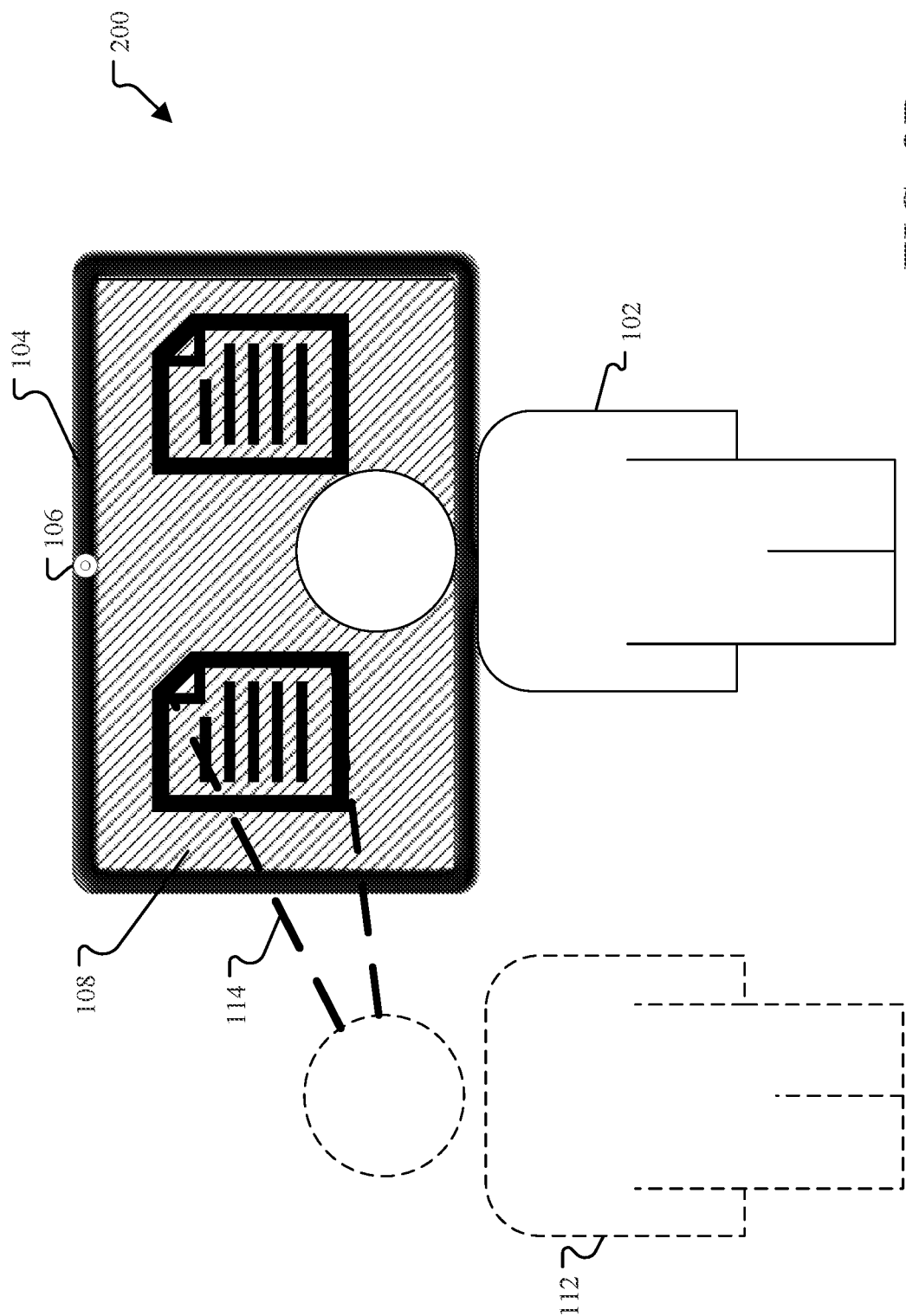
FIG. 2B illustrates an exemplary LCD from the off-axis perspective of an unintended viewer when a privacy mode is utilized, according to aspects described herein.

FIG. 2B illustrates an exemplary LCD from the off-axis perspective of an unintended viewer 112 when a privacy mode is utilized, according to aspects described herein. In FIG. 2B the unintended viewer 112 is at some face position and off-axis viewing angle 114 from the LCD 108. The image capture device 106 has identified the unintended viewer 112 and a privacy mode has been applied to the LCD 108. Modulate the drive voltage of the third electrode on the color filter layer of the LCD 108 to create low contrast which restricts the ability of the unintended viewer 112 to view the LCD 108 from certain viewing angles, as indicated by the diagonal lines on the LCD 108.

Figure 3B:
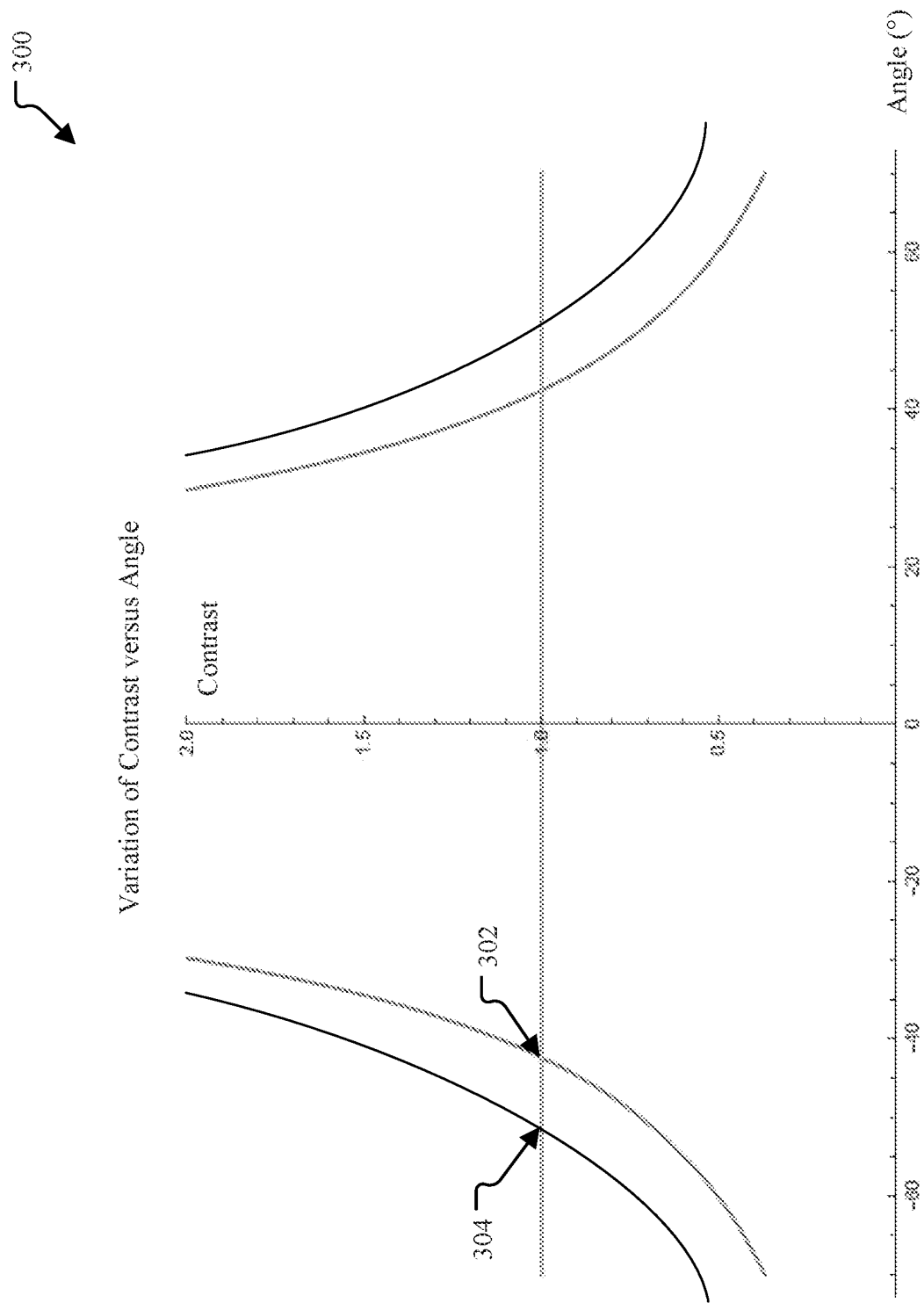
FIG. 3B is a sub-graph of FIG. 3A displaying a variation of contrast versus viewing angle, according to aspects described herein.

The graphs in FIGS. 3A and 3B display how changing the viewing angle at a fixed voltage can modify the contrast as one means for providing enhanced privacy for the LCD. FIG. 3A is a graph displaying a variation of contrast versus viewing angle, according to aspects described herein. In FIG. 3A a fixed voltage of 2.5 V is applied to the third electrode on the color filter layer on the color filter layer of the LCD. The x-axis of the graph represents the viewing angle, where zero is considered looking straight at the LCD from a relatively centered position. The y-axis of the graph is the contrast level. As will be appreciated, for high contrast the viewer has better visibility. As contrast decreases to low contrast, the visibility decreases and becomes poor. When a fixed 2.5 V is applied to the third electrode on the color filter layer a viewer sitting on-axis, meaning substantially zero degrees viewing angle, would have a high contrast and high visibility. Conversely, as a viewer is at either a positive or negative viewing angle off-axis, the contrast lowers and visibility is reduced, as shown in FIG. 2B. As the viewer approaches greater off-axis angles, the contrast will eventually be equal to and less than one, meaning the visibility is zero. In the example of FIG. 3A, at viewing angles equal to and greater than approximately 45 degrees an off-axis viewer will have zero visibility, as this is the point where CR equals one. The CR equals one point is where maximum privacy is achieved as off-axis visibility is zero.

FIG. 3B is a sub-graph of FIG. 3A displaying a variation of contrast versus viewing angle, according to aspects described herein. The horizontal line through 1.0 contrast indicates the zero-contrast point where CR equals one. Two different voltage graphs are depicted in FIG. 3B. Graph 302 displays a voltage of 2.5V applied to the third electrode on the color filter layer. Graph 304 displays a voltage of 1.5V applied to the third electrode on the color filter layer. The point where the horizontal line through 1.0 contrast intersects the voltage graph is the CR equals one zero visibility point for the applied voltage. In the present example, for graph 302 at 2.5V applied, the zero-visibility point is at angles greater than or equal to approximately plus or minus forty-five degrees off axis. For graph 304 at 1.5 V applied, the zero-visibility point is at angles greater than or equal to approximately plus or minus fifty-five degrees off axis. These are the points of maximum privacy, as the off-axis viewer has zero visibility below 1.0 contrast. As can be seen from the two graphs, changes in voltage applied to the third electrode on the color filter layer consequently change the CR equals one point of zero visibility for the off-axis viewer.

Figure 4:
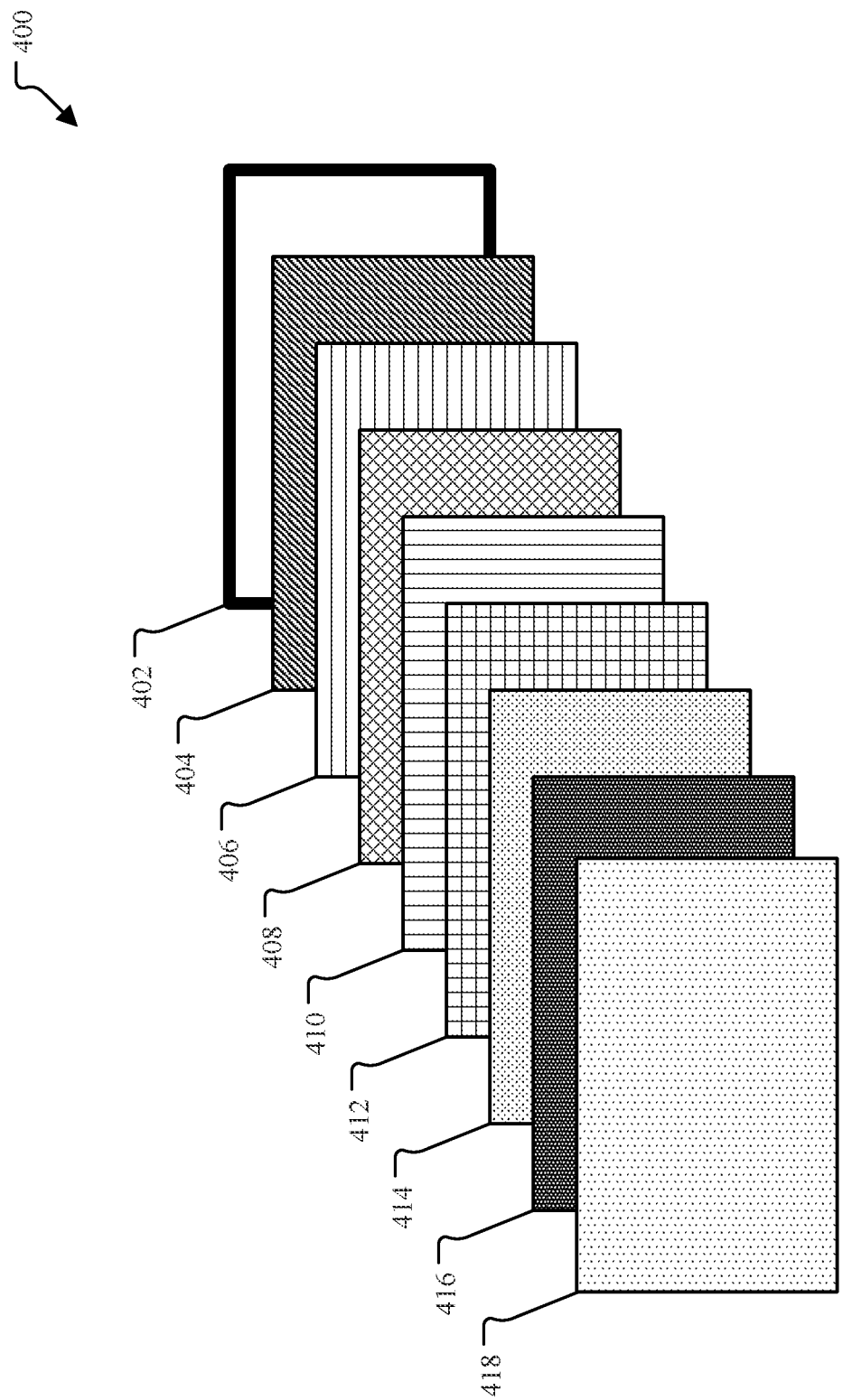
FIG. 4 is a block diagram illustrating the physical layers of an exemplary LCD, according to aspects described herein.

FIG. 4 is a block diagram illustrating the physical layers of an exemplary LCD, according to aspects described herein. In some examples, the LCD may be composed of the following layers. Layer 402 is a light source that sends light through the first polarizing filter 404 which then goes through a first electrode layer 406, then a thin film transistor layer 408, the liquid crystal layer 410, a second electrode layer 412, then a color filter layer 414. The third electrode is on the color filter layer 414 and is utilized to decrease the contrast for the system and reduce visibility for the unintended viewer 112. A second polarizing filter 416 is next and rotated 90 degrees off from the first polarizing filter 404, and finally there is a display glass layer 418. The liquid crystal layer 410 can be manipulated with the first electrode layer 406, the second electrode layer 412, and the third electrode on the color filter layer 414 to form an image and/or create a contrast region according to aspects described herein.

Figure 5:
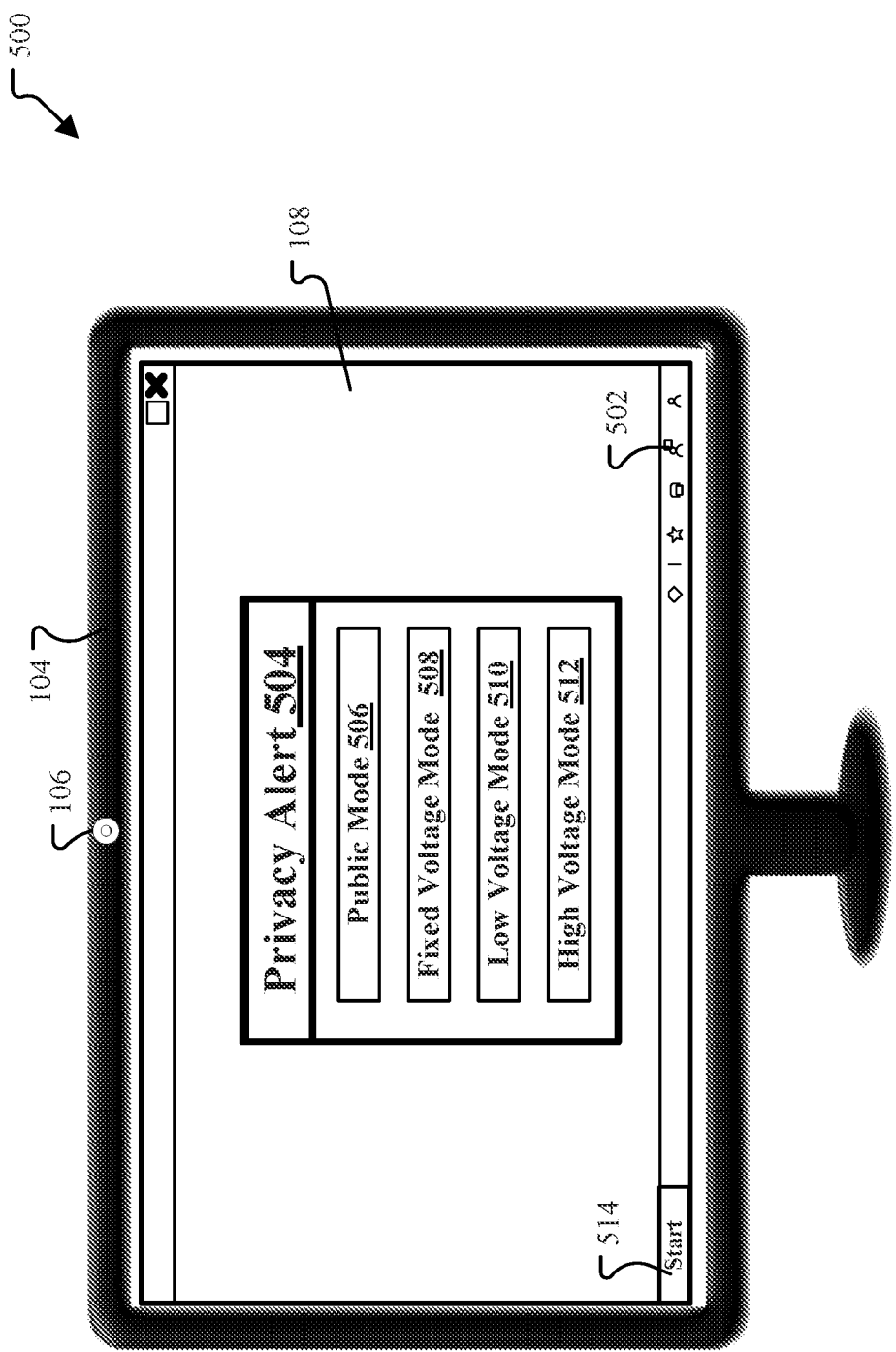
FIG. 5 is a block diagram illustrating an exemplary viewer interface with a request for a privacy mode selection from the viewer, according to aspects described herein.

FIG. 5 is a block diagram illustrating an exemplary viewer interface with a request for a privacy mode selection from the viewer, according to aspects described herein. The viewer interface (e.g., viewer interface 130) may display the exemplary privacy alert pop-up window 504 when the system determines an event has occurred which may indicate a privacy mode should be applied. This event may be when an unintended viewer (e.g., unintended viewer 112) is detected by the system, when an unintended viewer leaves the field of view of the LCD (e.g., LCD 108), when a system administrator is setting up the system, and/or at an initial login of an intended viewer (e.g., intended viewer 102) among other examples. The pop-up window 504 may include a message such as "Privacy Alert" to indicate that a privacy related event occurred and one or more selectable options 506, 508, 510, and 512. The selectable options may be any selectable option such as a tab, toggle button, link, check box, etc. They selectable options may include messages that indicate either a message or the type of privacy mode which can be selected with that option. For example, selectable option 506 includes a message prompting the viewer to select a "Public Mode" which would be no privacy mode applied, followed by three different privacy modes including selectable option 508 "Fixed Voltage Mode", selectable option 510 "Low Voltage Mode", and selectable option 512 "High Voltage Mode". The user may also access the privacy mode options from by selecting an icon 502 on the task bar and/or by selecting from the start menu 514. It will be appreciated by one having skill in the art that a plurality of other options for alerting the viewer and selecting a privacy mode exist and may be implemented by the system.

Figure 6:
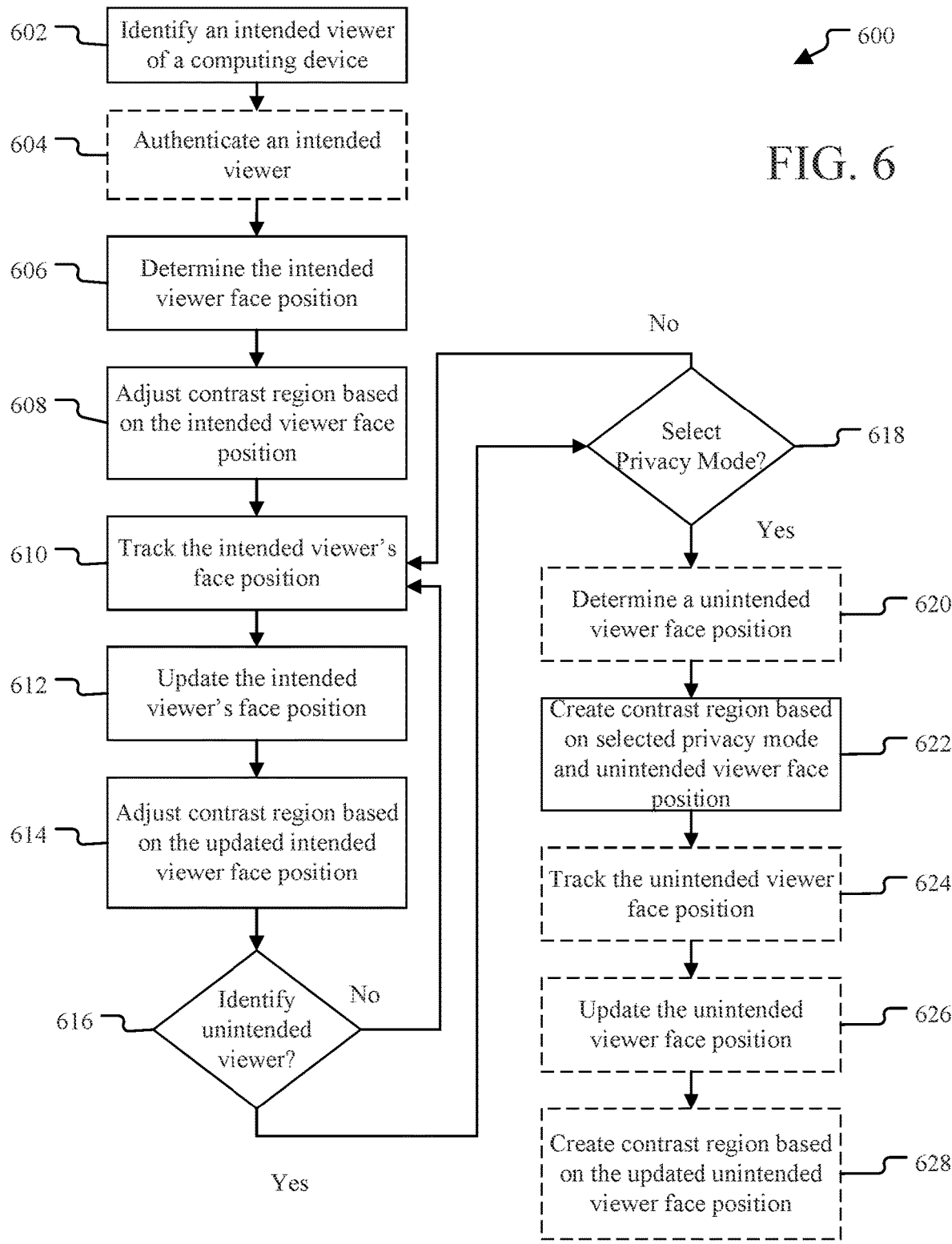
FIG. 6 is a flow chart illustrating a method for modulating the off-axis contrast of a LCD, according to aspects described herein.

FIG. 6 is a block diagram illustrating a method for modulating the off-axis contrast of a LCD, according to aspects described herein. A general order of the operations for the method 600 is shown in FIG. 6. Generally, the method 600 begins with operation 602 and ends with operation 628. The method 600 may include more or fewer steps or may arrange the order of the steps differently than those shown in FIG. 6. The method 600 can be executed as computer-executable instructions executed by a computer system and encoded or stored on a computer readable medium or other non-transitory computer storage media. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2A-B, 3A-3B, 4, 5, 7A-7B, 8, and 9.

At operation 602, an intended viewer may be identified with a face recognition processor (e.g., face recognition processor 122). An image capture device (e.g., image capture device 106) may capture one or more images with an intended viewer in the image. The one or more captured images may be passed to the face recognition processor which may identify an intended viewer based on one or more face position indicators of the intended viewer. In some examples at operation 604, the intended viewer may be authenticated by a viewer authenticator (e.g., viewer authenticator 124). The viewer authenticator may compare the captured images of the intended viewer with stored images (e.g., from data store 114) to determine if the intended viewer matches one of the stored images. If the intended viewer does match one of the stored images the intended viewer may be authenticated. If the intended viewer does not match one of the stored images the intended viewer may not be authenticated. Operation 220 is shown with a dashed line to indicate the step is optional and may be omitted in certain examples.

At operation 606 the intended viewer's face position is determined. The image capture device (e.g., image capture device 106) may continue to take images of the intended viewer and pass that information to a face recognition processor (e.g., face recognition processor 122) which will determine the intended viewer's face position. At operation 608, the face recognition processor will pass the intended viewer's face position to an LCD modulator (e.g., LCD modulator 128). The LCD modulator will modulate the drive voltage of an third electrode on the color filter layer of an LCD (e.g., LCD 108) to adjust the contrast region based on the intended viewers face position.

At operation 610, the image capture device (e.g., image capture device 106) may track the intended viewer's face position by taking subsequent images and at operation 612 pass the updated images to the face recognition processor (e.g., face recognition processor 122) which will update the intended viewer's face position based on the updated images. At operation 614 the LCD modulator (e.g., LCD modulator 128) will receive the updated face position and modulate the drive voltage by applying a voltage to the third electrode on the color filter layer of the LCD (e.g., LCD 108) to maintain the intended viewer's visual experience based on the updated face position.

At operation 616, an unintended viewer (e.g., unintended viewer 112) may or may not be identified by the image capture device (e.g., image capture device 106). If an unintended viewer is not identified flow progresses to operations 610 to 614 until an unintended viewer is identified. may continue to occur also occur if an unintended viewer is identified at operation 606. Alternatively, based on the one or more captured images from the image capture device (e.g., image capture device 106), the face recognition processor (e.g., face recognition processor 122) may identify an unintended viewer within the field of view of the computing device (e.g., computing device 104). When an unintended viewer is identified, flow progresses to operation 618 it may be determined if a privacy mode is selected by the intended viewer for the LCD (e.g., LCD 108). In some examples, an intended viewer and/or system administrator may have already selected a privacy mode for use when an unintended viewer is identified. In this case, the pre-selected privacy mode would be applied by the system. In other examples, when no privacy mode has been pre-selected a privacy alert (e.g., pop-up window, notification on the taskbar, menu option etc.) may be presented to the intended viewer via the viewer interface (e.g., viewer interface 130). If the intended viewer does not elect to use a privacy mode perhaps because they do not want to use a privacy mode and/or because the unintended viewer has been authenticated using the viewer authenticator (e.g., viewer authenticator 124) meaning the unintended viewer does not require a privacy mode, flow progresses to operation 610 and progresses as described above.

Alternatively, if a privacy mode is selected at operation 618 the intended viewer will select a privacy mode via the viewer interface (e.g., viewer interface 130). The intended viewer may select a privacy mode such as a fixed voltage or variable voltage privacy mode. At operation 620, if a variable voltage privacy mode is selected the image capture device (e.g., image capture device 106) may continue to take images of the unintended viewer (e.g., unintended viewer 112) and pass that information to a face recognition processor (e.g., face recognition processor 122) which will determine the unintended viewer's face position. Operation 620 is shown with a dashed line to indicate the step is optional and may be omitted in certain examples.

At operation 622, a contrast region may be created to restrict off-axis visibility of the LCD based on the selected privacy mode and the unintended viewer's face position. In examples, this may involve modulating the drive voltage of the third electrode on the color filter layer of the LCD (e.g., LCD 108). If the viewer selected a variable voltage privacy mode, the face recognition processor (e.g., face recognition processor 122) will pass the unintended viewer's face position (e.g., unintended viewer 112) from operation 620 to an LCD modulator (e.g., LCD modulator 128) which will modulate the drive voltage of a third electrode on the color filter layer of an LCD to place the CR equals 1 point on the unintended viewer's face position. In examples where the intended viewer selects a fixed voltage privacy mode then a fixed voltage will be applied to the third electrode on the color filter layer until the intended viewer turns off the privacy mode.

Operations 624 to 628 may occur if a variable voltage privacy mode is selected by the viewer. At operation 624, the image capture device (e.g., image capture device 106) may track the unintended viewer's face position (e.g., unintended viewer 112) by taking subsequent images and at operation 626 may pass the updated images to the face recognition processor (e.g., face recognition processor 122) which will update the unintended viewer's face position based on the updated images. At operation 628 the LCD modulator (e.g., LCD modulator 128) will receive the updated face position and create a contrast region based on the updated unintended viewer's face position. In examples, this may involve modulating the drive voltage of the third electrode of the LCD based on the updated face position to maintain the CR equals 1 point on the unintended viewer's face position. Operation 624 to 628 are shown with dashed lines to indicate the steps are optional and may be omitted in certain examples.

Figure 7:
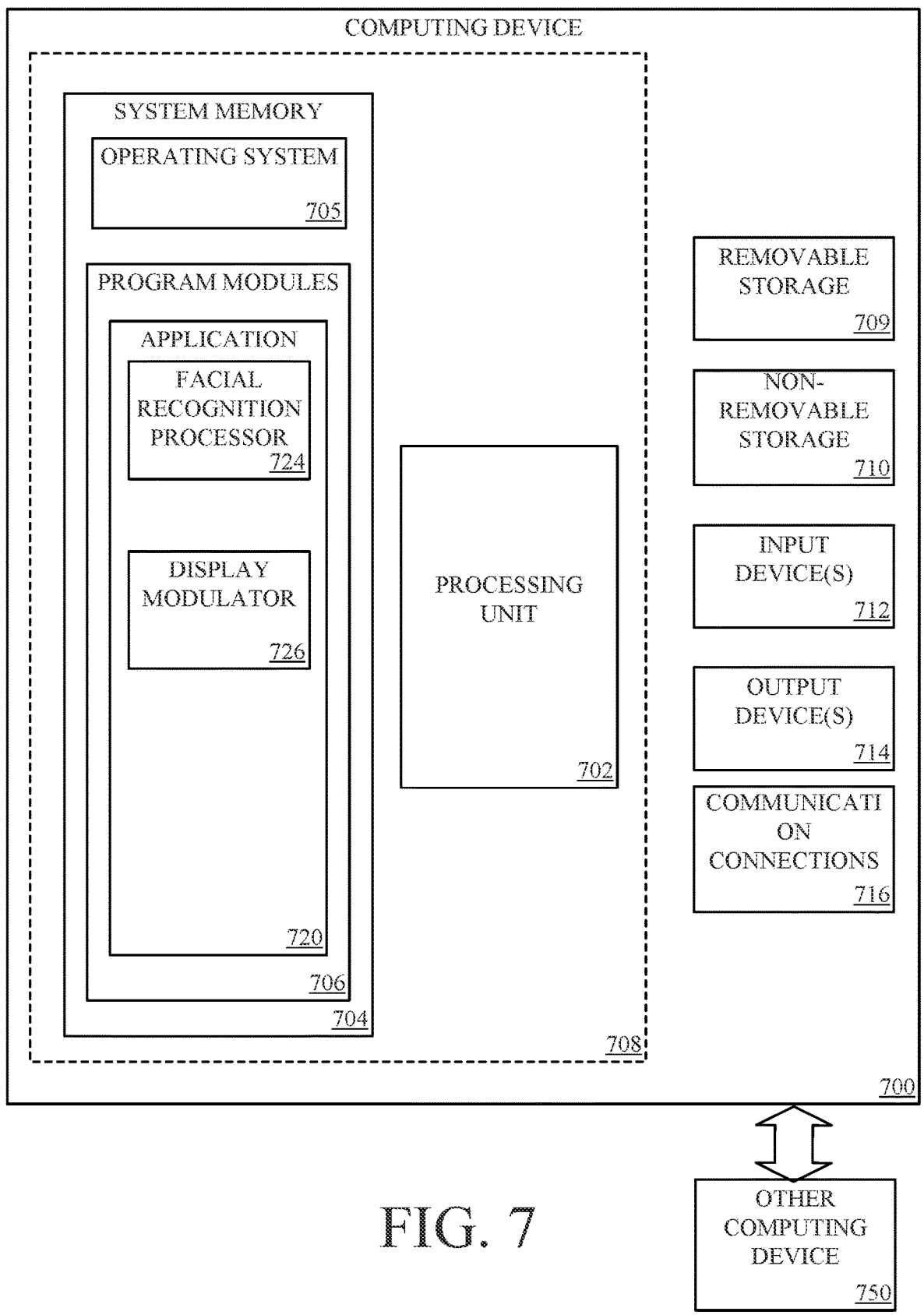
FIG. 7 illustrates a block diagram illustrating example physical components of a computing device with which aspects of the disclosure may be practiced.
Figure 8:
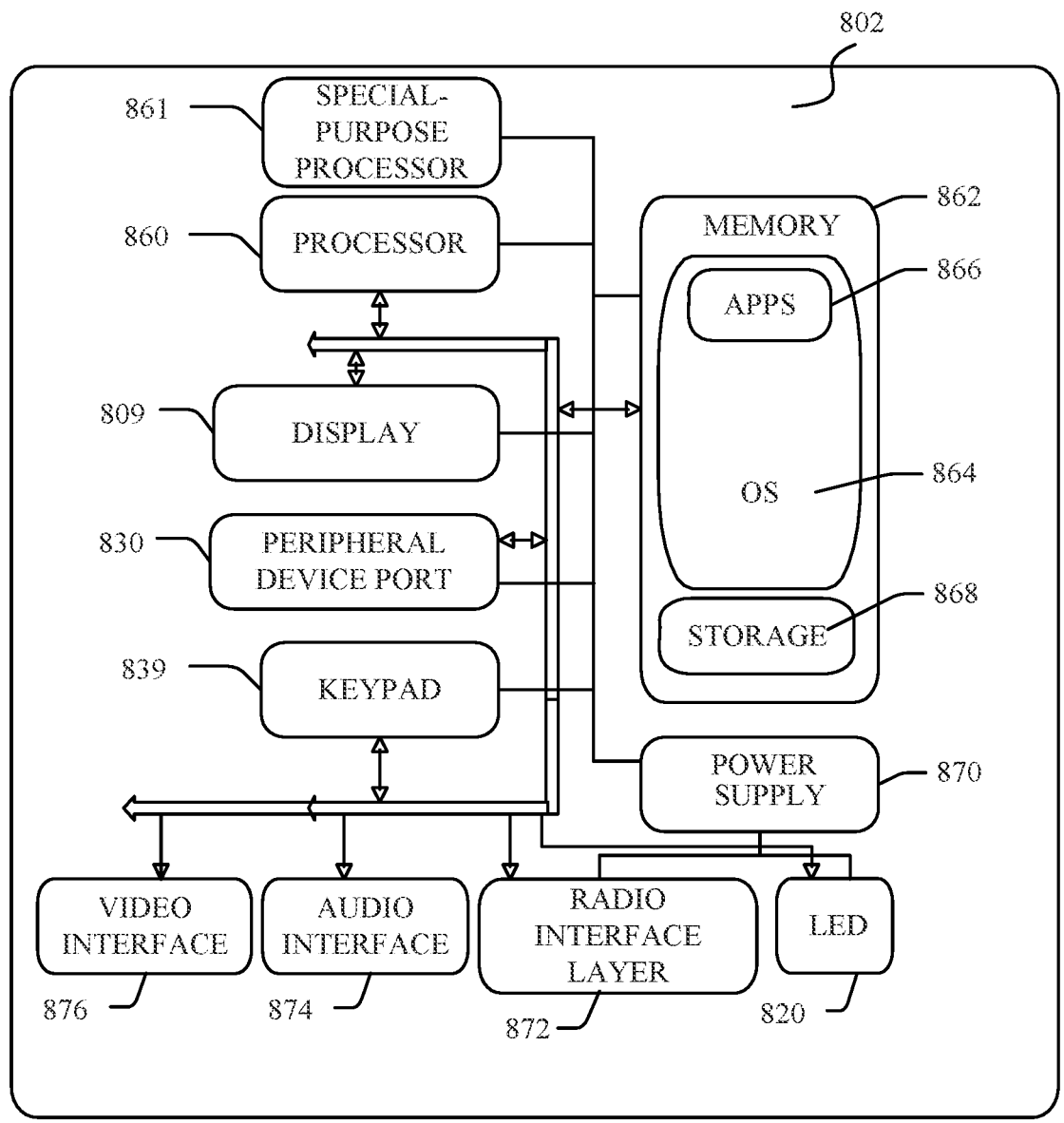
FIG. 8 illustrates a simplified block diagrams of a computing device with which aspects of the present disclosure may be practiced.
Figure 9:
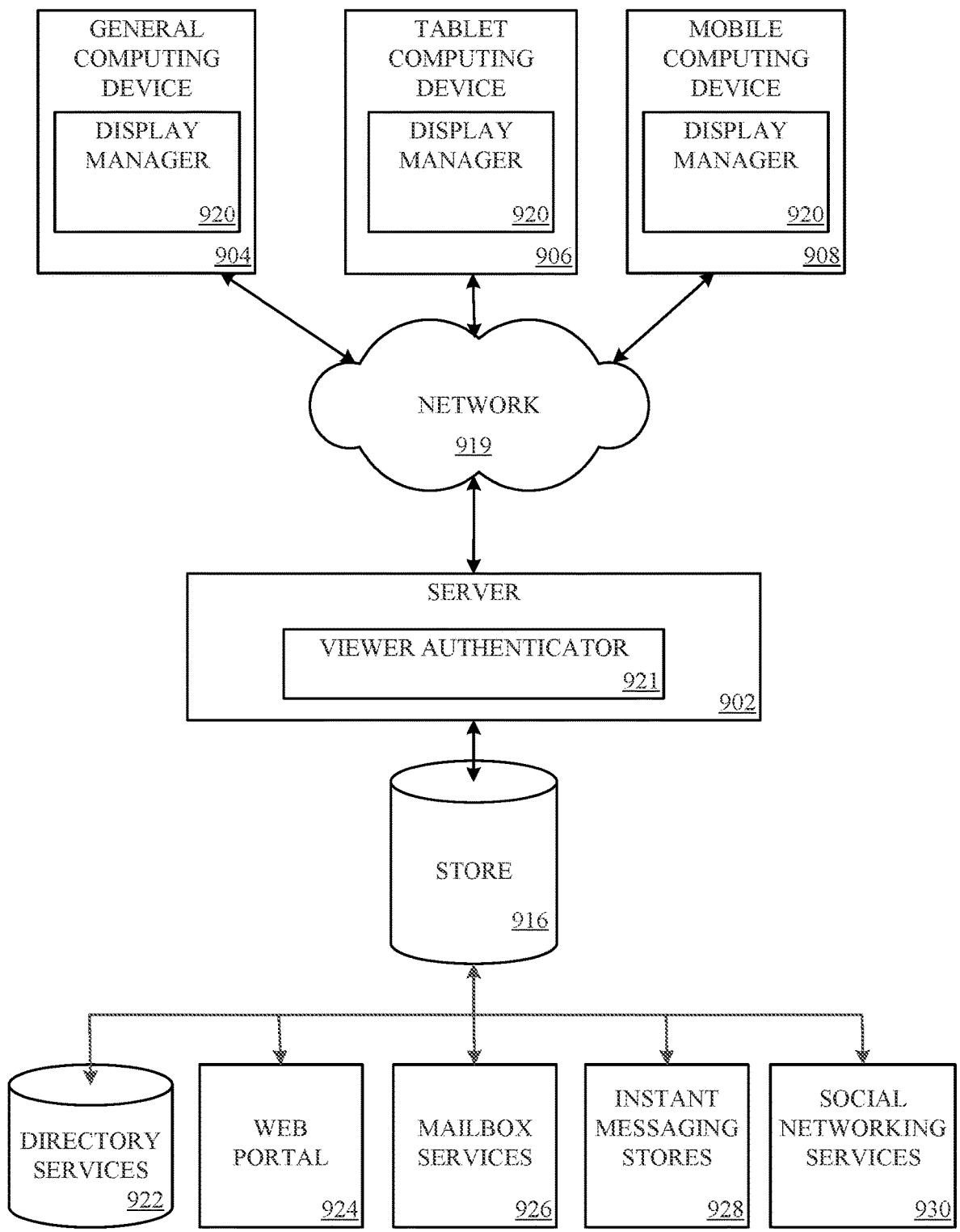
FIG. 9 is a simplified block diagram of a distributed computing system in which aspects of the present disclosure may be practiced.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above, including computing device 104 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store face recognition processor 724 and/or LCD modulator 726. The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 8 is a block diagram illustrating the architecture of one aspect of a computing device. That is, the computing device can incorporate a system (e.g., an architecture) 802 to implement some aspects. In some examples, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., an embedding object memory insertion engine, an embedding object memory retrieval engine, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and/or special-purpose processor 861 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A computing device implementing the system 802 may have additional features or functionality. For example, the computing device may also include additional data storage devices (removable and/or non-removable) such as, magnetic disks, optical disks, or tape. Such additional storage is illustrated in FIG. 8 by the non-volatile storage area 868.

Data/information generated or captured by the computing device and stored via the system 802 may be stored locally on the computing device, as described above, or the data may be stored on any number of storage media that may be accessed by the device via the radio interface layer 872 or via a wired connection between the computing device and a separate computing device associated with the computing device, for example, a server computer in a distributed computing network, such as the Internet. As should be appreciated such data/information may be accessed via the computing device via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 924, a web portal 925, a mailbox service 926, an instant messaging store 928, or a social networking site 930.

A display manager 920 (e.g., similar to the application 620) may be employed by a client that communicates with server device 902. Additionally, or alternatively, viewer authenticator 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, cause the system to perform a set of operations, the set of operations comprising:
   identify an intended viewer of a liquid crystal display;
   identify an unintended viewer of the liquid crystal display;
   determine a face position of the unintended viewer relative to the liquid crystal display; and
   create a contrast region on the liquid crystal display based on the face position of the unintended viewer, in order to reduce the visibility of the liquid crystal display for the unintended viewer.

2. The system of claim 1, wherein determining the face position of the unintended viewer further comprises:
   track the face position of the unintended viewer relative to the liquid crystal display with an image capture device.

3. The system of claim 1, further comprising:
   determining if a privacy mode should be applied to the liquid crystal display;
   when a privacy mode is not applied, maintaining the liquid crystal display in public mode; and
   when a privacy mode is applied, applying the privacy mode to the liquid crystal display.

4. The system of claim 1, wherein identifying the intended viewer further comprises:
   obtain an image of the face of the intended viewer;
   retrieve one or more images of faces of authenticated viewers;
   compare the obtained image of the face of the intended viewer with the images of the authenticated viewers; and
   when the obtained image of the face of the intended viewer matches one of the images of the authenticated viewers, authenticate the intended viewer.

5. The system of claim 4, when the obtained image of the face of the intended viewer does not match one of the authenticated viewers faces further comprises:
   restrict the intended viewer's access to the liquid crystal display.

6. The system of claim 1, wherein the unintended viewer face position is relative to the on-axis viewing angle of the liquid crystal display.

7. The system of claim 1, when multiple unintended viewers are identified further comprising:
   determine a face position for each of the multiple unintended viewers relative to the liquid crystal display;
   modulate a drive voltage of an electrode on a color filter layer of the liquid crystal display based on the unintended viewer whose face position is in closest proximity to the liquid crystal display, in order to reduce the visibility of the liquid crystal display for the unintended viewer.

8. A method comprising:
   identifying an intended viewer of a liquid crystal display;
   identifying an unintended viewer of the liquid crystal display;
   determining an unintended viewer face position relative to the liquid crystal display;
   create a contrast region on the liquid crystal display based on the unintended viewer face position without substantially restricting the on-axis visual experience;
   tracking the unintended viewer face position;
   updating unintended viewer face position relative to the liquid crystal display; and
   create a contrast region on the liquid crystal display based on the updated unintended viewer face position without substantially restricting the on-axis visual experience.

9. The method of claim 8, further comprising:
   determining if a privacy mode should be applied to the liquid crystal display;
   when a privacy mode is not applied, maintaining the liquid crystal display in public mode; and when a privacy mode is applied, applying the privacy mode to the liquid crystal display.

10. The method of claim 9, wherein the privacy mode option may be presented as a pop-up window, task bar item, or menu option.

11. The method of claim 9, wherein the privacy mode further comprises a variable voltage privacy mode.

12. The method of claim 8, further comprises:
tracking a face position of the intended viewer relative to the liquid crystal display; and
updating the face position of the intended viewer relative to the liquid crystal display.

13. The method of claim 8, wherein identifying the intended viewer further comprises:
obtaining an image of the face of the intended viewer with one or more face indicators;
retrieving one or more images of authenticated viewers having faces with one or more face indicators; and
comparing the obtained image of the intended viewer with images of authenticated viewers.

14. The method of claim 13, further comprises:
when the obtained image of the intended viewer matches one of the images of authenticated viewers, authenticating the intended viewer.

15. The method of claim 13, further comprises:
when the obtained image of the intended viewer does not match one of the images of authenticated viewers, restricting the intended viewer's access to the liquid crystal display.

16. A system comprising:
at least one processor; and
memory storing instructions that, when executed by the at least one processor, cause the system to perform a set of operations, the set of operations comprising:
identify an intended viewer of a liquid crystal display;
identify an unintended viewer of the liquid crystal display;
determine an unintended viewer face position relative to the liquid crystal display;
create a contrast region on the liquid crystal display based on the unintended viewer face position without substantially restricting the on-axis visual experience;
track the unintended viewer face position;
update the unintended viewer face position relative to the liquid crystal display; and
create a contrast region on the liquid crystal display based on the updated unintended viewer face position without substantially restricting the on-axis visual experience.

17. The system of claim 16, further comprising:
determine if a privacy mode should be applied to the liquid crystal display;
when a privacy mode is not applied, maintain the liquid crystal display in public mode; and
when a privacy mode is applied, apply the privacy mode to the liquid crystal display.

18. The system of claim 17, wherein the privacy mode option may be presented as a pop-up window, task bar item, or menu option.

19. The system of claim 16, wherein the privacy mode further comprises a fixed voltage privacy mode.

20. The system of claim 16, wherein identify an intended viewer further comprises:
obtain a face image of the intended viewer with one or more face indicators;
retrieve one or more face images of authenticated viewers, where each image has one or more face indicators;
compare the obtained face image of the intended viewer with the face images of the authenticated viewers; and
when the obtained face image of the intended viewer matches one of the images of the authenticated viewers, authenticate the intended viewer.

* * * * *